(12) United States Patent
Barry (10) Patent No.: US 7,590,141 B1
(45) Date of Patent: Sep. 15, 2009

(54) METHOD AND APPARATUS FOR AN AUTOMATIC NETWORK BOOT PROCEDURE FOR A RESOURCE IN A UTILITY COMPUTING ENVIRONMENT

(75) Inventor: Timothy G. Barry, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 11/262,435

(22) Filed: Oct. 28, 2005

(51) Int. Cl.
*H04L 12/42* (2006.01)
(52) U.S. Cl. ...................................... 370/457
(58) Field of Classification Search ............. None
See application file for complete search history.

(56) References Cited

U.S. PATENT DOCUMENTS 6,345,294 B1 * 2/2002 O'Toole et al. ............. 709/222
6,539,473 B1 * 3/2003 Hubacher et al. ............. 713/2
7,089,300 B1 * 8/2006 Birse et al. .................. 709/221

OTHER PUBLICATIONS

Trinks et al, Resource-Sharing and Service Deployment in Virtual Data Centers, IEEE, 6 pages, 2003.*
Intel, Preboot Execution Environment (PXE) Specification, 103 pages, 1999.*

* cited by examiner

*Primary Examiner*—Frank Duong (57) ABSTRACT

Embodiments of the invention provide a method and an apparatus for an automatic network boot procedure for a resource in a utility computing environment. In one method embodiment, the present invention receives a media access control (MAC) address from a resource in a utility computing environment. The MAC address for the resource is compared with a database of assigned manufacturer MAC addresses. A manufacturers netboot kernel corresponding to the assigned manufacturer MAC address is provided to the resource automatically.

25 Claims, 6 Drawing Sheets

|  | 502 | 504 | 506 |
|---|---|---|---|
|  | OUI MAC Address Range (hex) | OUI MAC Address Range (base 16) | Manufacturer |
| 510 | 00:0D:9D:00:00:00<br><br>to<br><br>00:0D:9D:FF:FF:FF | 000D9D000000<br><br>to<br><br>000D9DFFFFFF | Hewlett-Packard<br>20555 State Highway 249 south<br>Houston, TX 77070<br>US |
| 520 | 00:0E:7F:00:00:00<br><br>to<br><br>00:0E:7F:FF:FF:FF | 000E7F000000<br><br>to<br><br>000E7FFFFFFF | Hewlett-Packard<br>20555 State Highway 249 south<br>Houston, TX 77070<br>US |
| 530 | 00:0F:20:00:00:00<br><br>to<br><br>00:0F:20:FF:FF:FF | 000F20000000<br><br>to<br><br>000F20FFFFFF | Hewlett-Packard<br>20555 State Highway 249 south<br>Houston, TX 77070<br>US |

METHOD AND APPARATUS FOR AN AUTOMATIC NETWORK BOOT PROCEDURE FOR A RESOURCE IN A UTILITY COMPUTING ENVIRONMENT

TECHNICAL FIELD

The present invention generally relates to network servers. More specifically to a method and an apparatus for an automatic network boot procedure for a resource in a utility computing environment.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems and switches (as well as other devices). Devices such as computer systems, routers, switches, load balancers, firewalls, and the like, are commonly linked to each other in networks.

In one embodiment, a LAN is established and/or managed by having a technician physically connecting devices according to a network plan. That is, when a plurality of resources is to be used in a network, the technician will connect the devices physically and install the correct software into the devices by hand. Each time a modification to the network or software is necessary, the technicians must manually connect or disconnect the devices or manually install or change the software to perform the modification.

To resolve the manual modification process, many modern networks also have in-house data centers that include technicians working from a network operation center (NOC). The technicians issue commands to control the deployment of servers and to control the supporting infrastructures, such as disk logical units (LUNs) in a disk array, network switches in the LAN, and the like.

Although a NOC is used in the present in-house data centers to control the network, there are still manual requirements for interaction with components within the network during start up of a resource, new installation of a resource, or the like. For example, in order to introduce new servers into the LAN and capitalize on the dynamic host configuration protocol (DHCP) and/or the bootstrap protocol services, a technician is required to manually enter and configure the options for each server in advance of it being utilized by the DCHP databases to netboot the system.

However, requiring a technician to physically interact directly with the servers for configuration within the network is labor intense and error prone. In other words, due to the manual configuration requirement, the technician must be capable of physically reaching and interacting with each server in the network. This technical effort is time consuming and labor intense when a few servers are part of the network and it becomes extremely impractical and time consuming when adding hundreds of server systems onto the network. The problem is even more deleterious in a utility computing environment wherein the resources within the network are virtually allocated and reallocated from one client to another. That is, since the reallocation process inevitably involves one or more reboot cycles, due to varying client system configurations (e.g., custom boot images and data volumes) each reboot and system reconfiguration would result in the technician having to again manually interacting with the allocated servers during each boot process.

DISCLOSURE OF THE INVENTION

Embodiments of the invention provide a method and an apparatus for an automatic network boot procedure for a resource in a utility computing environment. In one method embodiment, the present invention receives a media access control (MAC) address from a resource in a utility computing environment. The MAC address for the resource is compared with a database of assigned manufacturer MAC addresses. A manufacturers netboot kernel corresponding to the assigned manufacturer MAC address is provided to the resource automatically.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments of the present invention provide a method for an automated process to automatically recognize and configure a non-booted resource through network pre-boot and network hosted post-boot configuration in a utility data center (UDC). In other words, the non-booted resource can now be introduced into a utility computing environment without requiring a technician to manually interact with and configure options on the non-booted resource. The process can be easily deployed on an already active system or integrated into previously designed utility computing environments.

For example, in one embodiment, a standard network boot image is created for different architecture types deployed in the service core. The standard network boot image initially creates a table that maps MAC address assignment ranges to system architecture types by taking advantage of the mapping between LAN cards and vendor architecture types. In addition, generic network boot kernels and instructions for configuring those server architectures is built for a subset of the netboot images to cover the different vendor architecture types. When a network card supporting a server provides a MAC address in a certain range, the table is used to look up the MAC address, and provide the architecture type. A netboot kernel and configuration instructions (e.g., scripts) are then generated for the server's architecture type and provided to the server in the pre-boot environment. The netboot server is therefore automatically configured and integrated into the pool of utility computing (UC) servers. In so doing, the requirements for manual intervention to activate the newly added servers for a pool of arbitrary vendor types, models or different configurations are removed.

In general, numerous utility computing environments exist, one of those, for example, is the utility data center (UDC) available from Hewlett-Packard of Palo Alto, Calif. Although such a specific implementation will be mentioned herein, it should be understood that embodiments of the present invention are also well suited to use with various other utility computing environments. The present description begins with an overview of such an environment. The details of the automatic network boot procedure's use and operation are then described in further detail.

Figure 1:
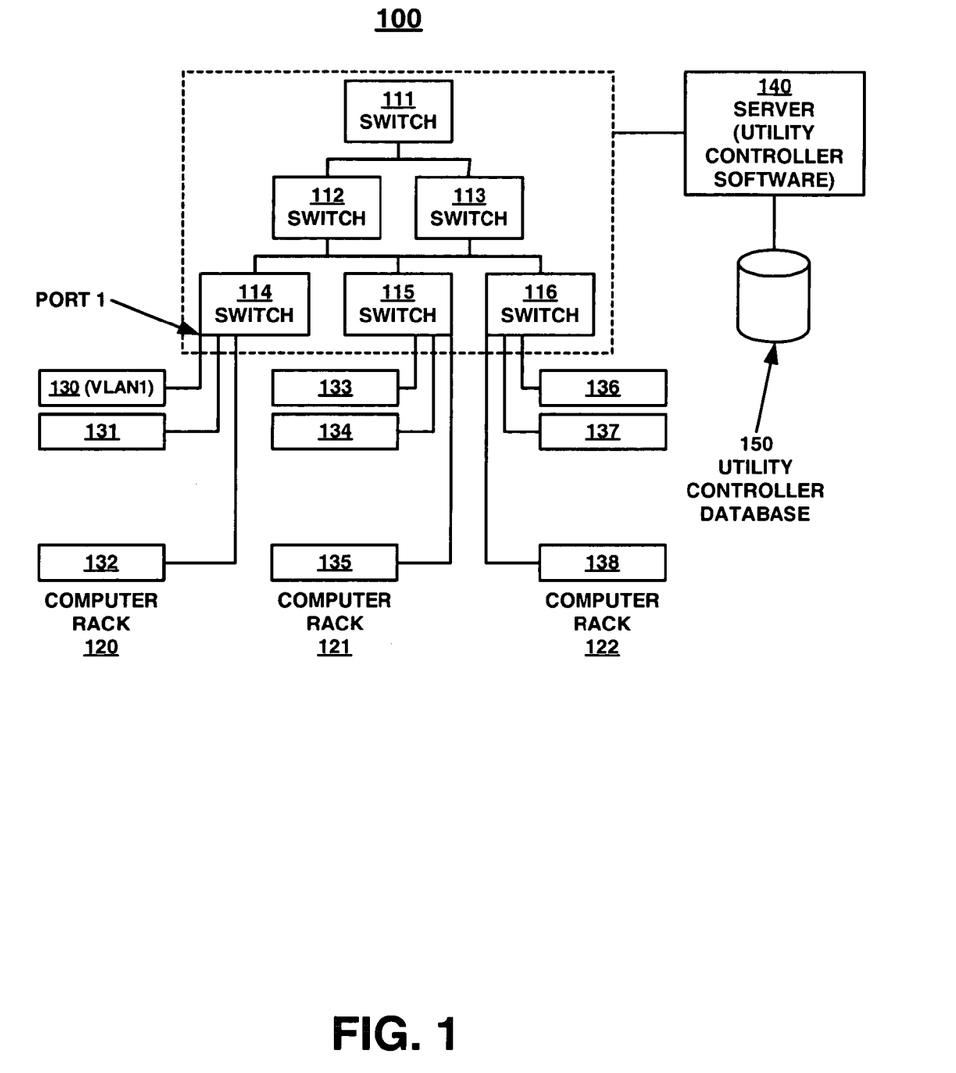
FIG. 1 is a block diagram of an exemplary LAN upon which embodiments of the present invention can be implemented.

With reference now to FIG. 1, a block diagram of an exemplary local area network (LAN) 100 is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein. Although a LAN is described herein, embodiments of the present invention are well suited for utilization with other types of networks.

In the present embodiment, LAN 100 includes a number of switches 111 through 116, and a number of computers 130-138 that are coupleable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of VLANs. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure. In addition to computer systems and switches, LAN 100 can include other types of devices such as, but not limited to, routers, load balancers, firewalls, and hubs. These other types of devices may also be programmable or configurable.

Figure 2:
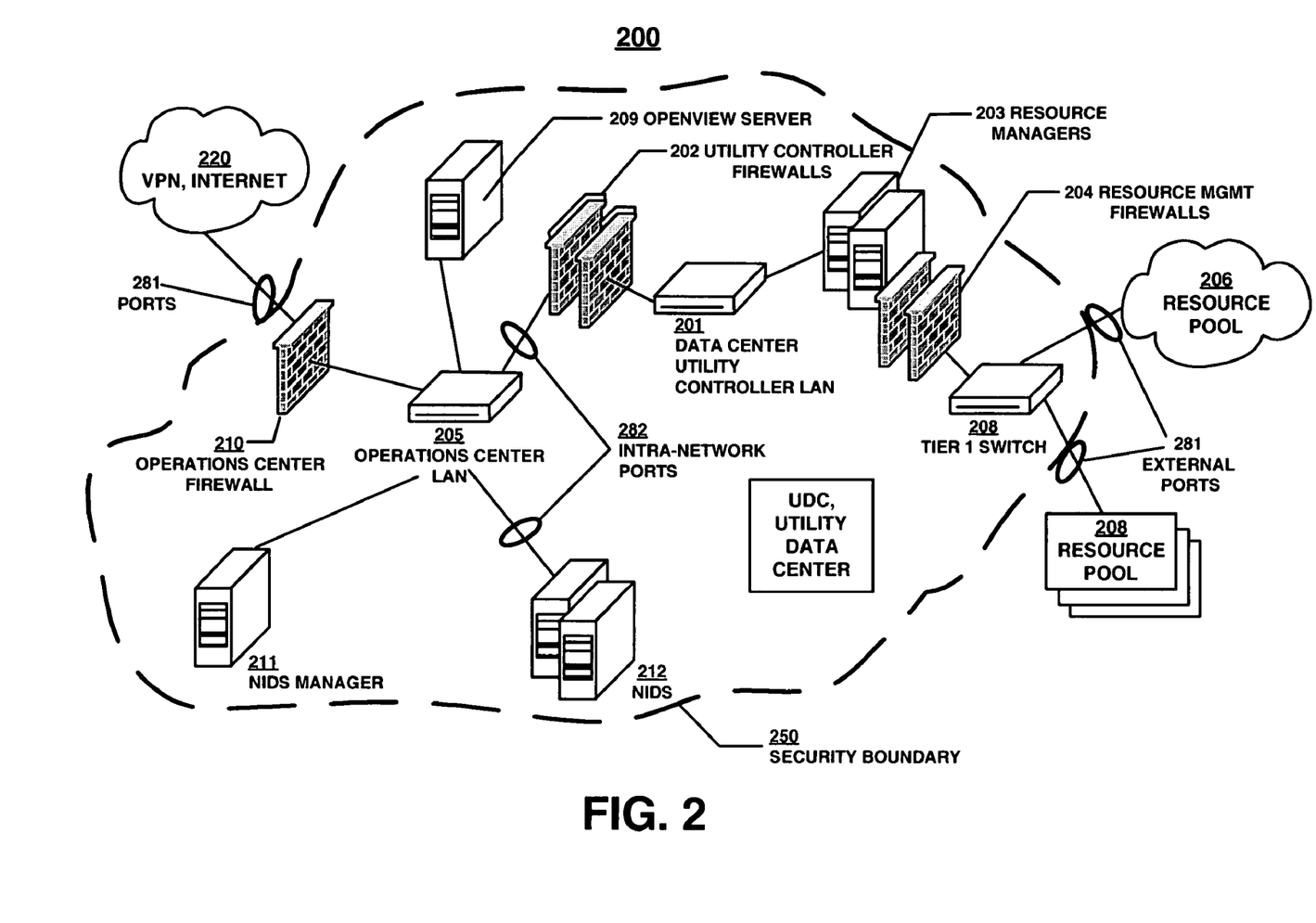
FIG. 2 is a block diagram of an exemplary utility computing environment in accordance with one embodiment of the present invention.

With reference now to FIG. 2, an exemplary provisionable network in which embodiments of the present invention can function is shown. Provisional network, or utility computing environment (UCE), 200 is shown bounded by a security boundary 250. In one embodiment, security boundary 250 is a virtual boundary. Boundary 250 is shown here only to help illuminate the concepts presented herein. Typical UCE 200 comprises an operations center local area network (LAN) 205, a data center utility controller LAN 201 and resource pools 206. It is noted here that, by their very nature, UCEs are flexible in their composition, comprising any number and type of devices and systems. It is this flexibility from which they derive their usefulness. The specific architecture illustrated in FIG. 2, therefore, is not meant to limit the application of embodiments of the present invention to any particular provisionable network architecture.

Typical UCE 200, in this illustration, communicates with the outside world via the Internet 220 and virtual public networks (VPNs) in the Internet. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that communications into and out of a provisionable network, as in any network, is accomplished through ports such as illustrated at 281. Communications between devices within a network are also conducted through ports, as alluded to at 282. It is noted that ports are not necessarily physically located at the periphery of a network but are logical end points. External ports 281 and intra-network ports 282 are shown only to help illustrate the concepts presented in embodiments of the present invention. It is also noted that virtual security boundary 250 does not exist in a physical sense. Resources included in the servers and LANs comprising utility computing environment 200 may include devices and servers located remotely from the other elements of the UCE.

As shown in FIG. 2, operations center (OC) LAN 205 comprises an internal trust domain. Included in OC LAN 205 are open view servers 209, network intrusion detection system (NIDS) 212 and NIDS manager 211. It is noted that, though NIDS 212, NIDS manager 211 are illustrated as computer-like devices, their physical existence is not limited to a particular device. Each may exist as a standalone device or implemented as software resident in a physical device or server.

The heart of the exemplary utility computing environment illustrated in FIG. 2 is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UCE concept can result in many combinations of resources and resource managers. Resource managers 203 are the typical interface with the various pools of resources 206, communicating with them through ports and some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

It is noted that embodiments of the present invention can run in many different environments. One network management environment in which an embodiment operates serves as an end-to-end service management infrastructure and is particularly well suited to managing a provisionable network that is known as a utility data center (UDC).

Figure 3:
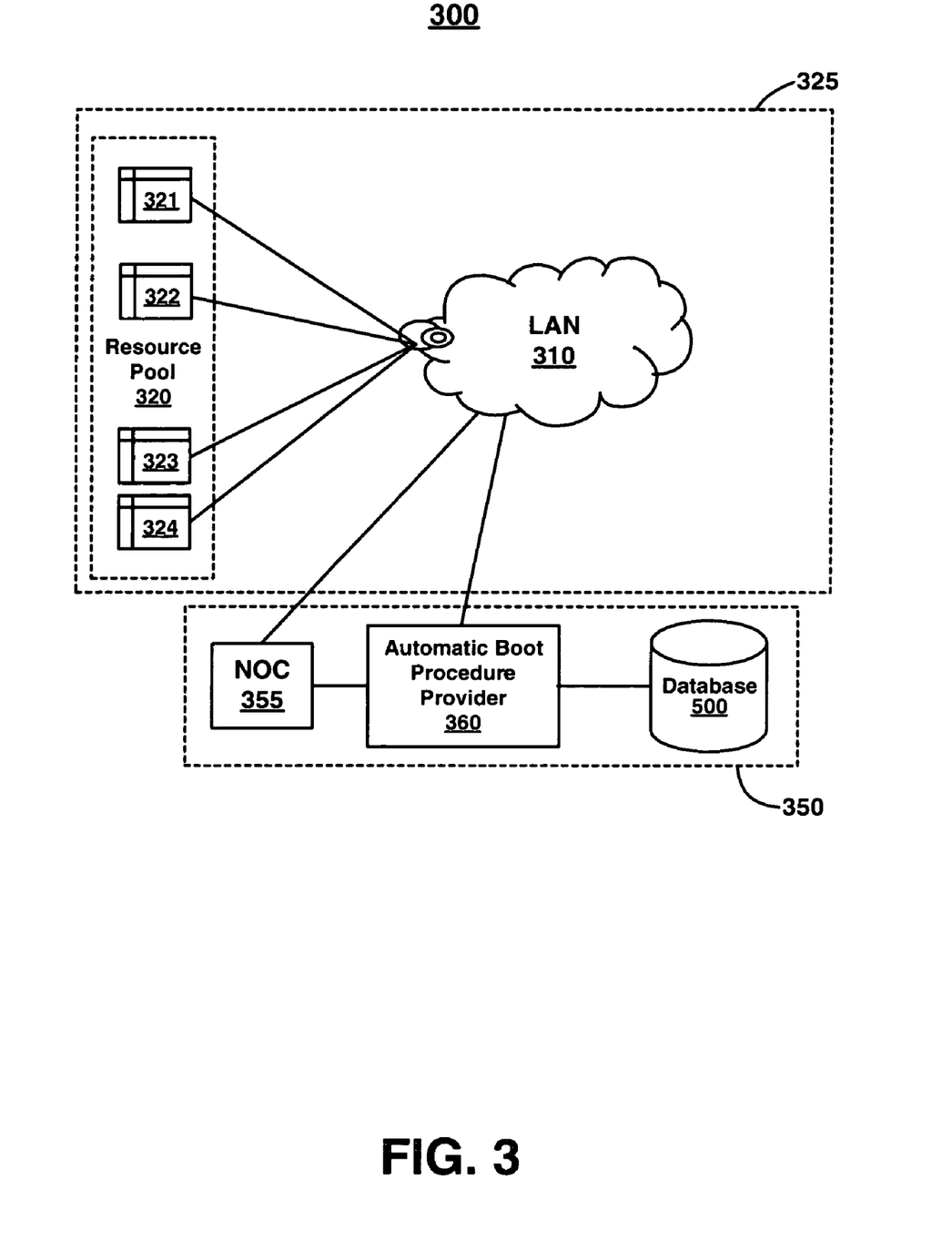
FIG. 3 is a block diagram of an exemplary utility computing environment with an automatic boot procedure provider in accordance with one embodiment of the present invention.

With reference now to FIG. 3, a block diagram of an exemplary utility computing environment 300 with automatic boot procedure provider 360 is shown in accordance with one embodiment of the present invention. In general, network 300 includes a provisionable portion 325 and a utility computing environment portion 350. In one embodiment, provisionable portion 325 includes a local area network (LAN) 310. Similar to LAN 100 of FIG. 1, LAN 310 can include elements such as racks, routers, cables, switches and other elements that are well known in the art. Network 300 also includes a plurality of resources (e.g., 321-324) in a resource pool 320. In one embodiment, resource pool 320 also includes servers, disk arrays, and the like.

In one embodiment, the data center portion 350 includes the network operations center (NOC) 355, the automatic boot procedure provider 360 and a database 500. As described herein, the network operation center 355 is a central management location accessible to technicians. The automatic boot procedure provider 360 is an automated process for booting an unknown server type on the LAN. In one embodiment, the automatic boot procedure provider 360 utilizes the database 500 as a reference for comparing a received MAC address from the unknown server type to a listing of MAC addresses to establish the architecture type correlating to the unknown server. The correlation is then used to provide the correct system architecture netboot kernels and configuration protocols to the unknown server type to automatically boot the server within the UC network. The automatic boot procedure provider 360 and database 500 are described in more detail herein.

In one embodiment, LAN 310 includes a number of connections coupled to a number of computing devices 321-324 (e.g., resource pool 320). Typically, the computing devices 321-324 are connected with the LAN 310 using cables or the like. However, wireless connections between the computing devices 321-324 and LAN 310 are also contemplated.

Figure 4:
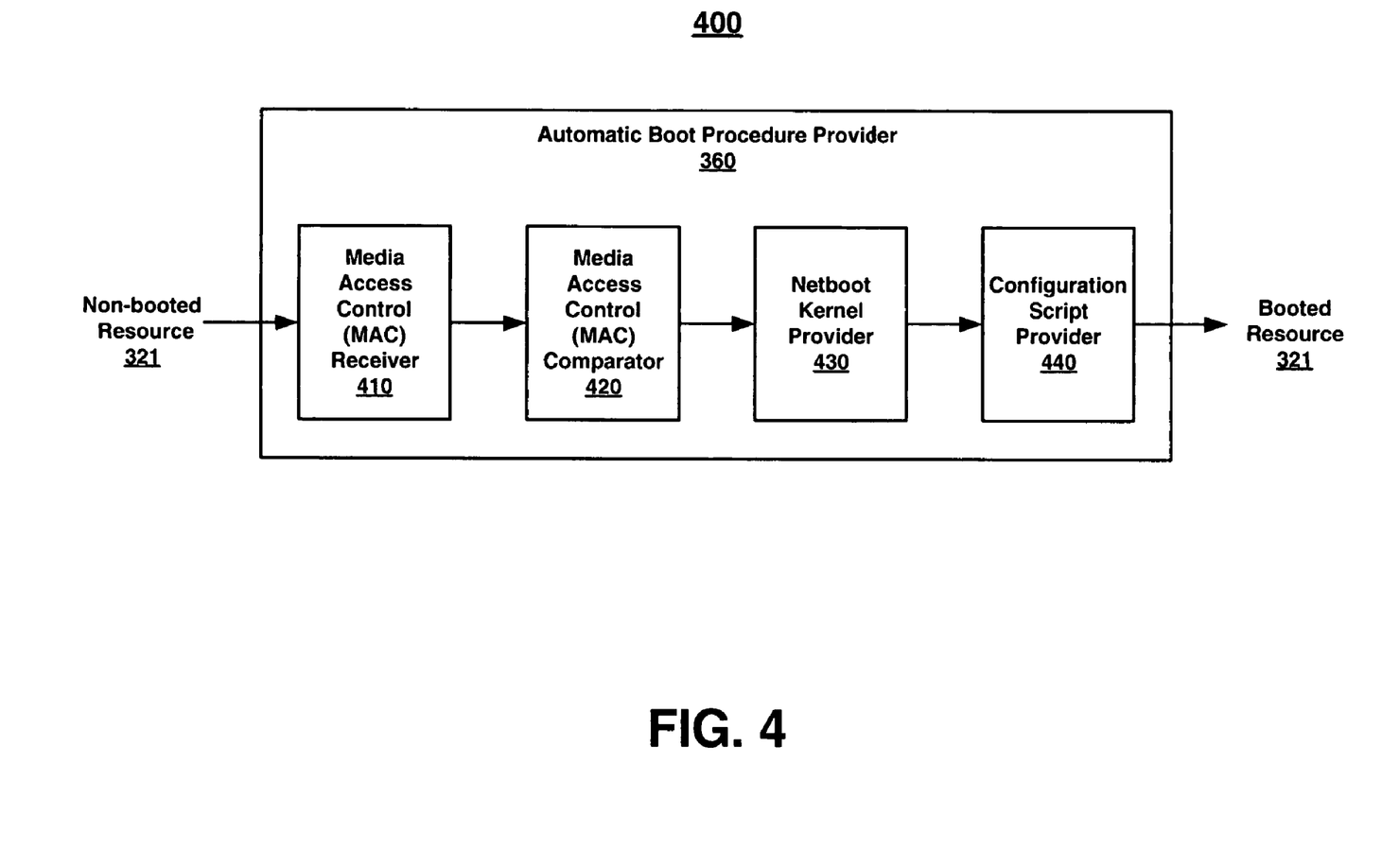
FIG. 4 is a block diagram of an exemplary automatic boot procedure provider for a utility computing environment in accordance with one embodiment of the present invention.

With reference now to FIG. 4, a block diagram 400 of automatic boot procedure provider 360 is shown in accordance with an embodiment of the present invention. In one embodiment, the automatic boot procedure provider 360 includes a media access control (MAC) receiver 410, a MAC comparator 420, a netboot kernel provider 430 and a configuration script provider 440.

In general, automatic boot procedure provider 360 allows administrative boot commands to be issued by an external client (e.g., a computing device). In one embodiment, the automatic boot procedure provider 360 is utilized to receive a MAC address request from a non-booted resource 321-324, compare the MAC address with a database of assigned manufacturer's MAC addresses, return a manufacturer's netboot kernel that corresponds to the assigned manufacturer MAC address, receive any additional configuration scripts and provide the results automatically to the non-booted resource 321-324.

In operation, the automatic boot procedure provider 360 initially receives an Internet Protocol (IP) address request from a non-booted resource (e.g., resource 321) to the MAC receiver 410. In one embodiment, the request contains the MAC address of that non-booted resource 321. Once the MAC receiver 410 receives the boot request, the non-booted resource 321's MAC address is passed to the comparator 420. Although the non-booted resource is referred to herein as resource 321, it is understood that any server may be used. The utilization of resource 321 in the present example is merely for purposes of brevity and clarity.

In one embodiment, the MAC comparator 420 performs a MAC address comparison. That is, the comparator 420 compares the MAC address received from the non-booted resource 321 to a database of manufacturer MAC addresses (such as database 500 of FIG. 5) to determine the system architecture of the non-booted resource 321. For example, if non-booted resource 321 had a MAC address in the range of 08:00:09:00:00:00 to 08:00:09:FF:FF:FF, it would be identified in the database as a Hewlett-Packard network adapter known only to support its PA-RISC servers.

Figure 5:
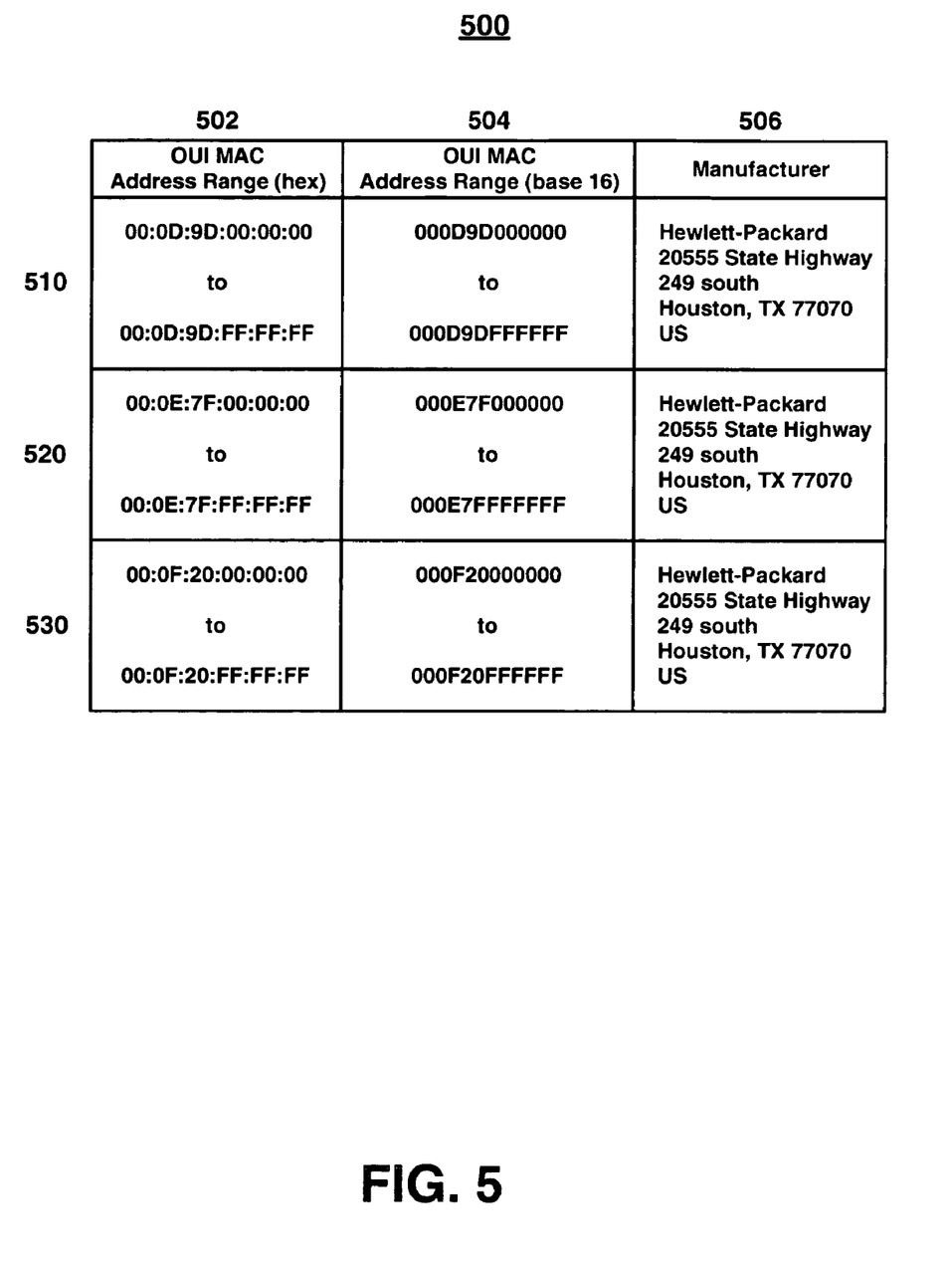
FIG. 5 is a table of an exemplary database containing data fields in accordance with one embodiment of the present invention.

Once the MAC address for the non-booted resource 321 is compared with the database 500 of FIG. 5, and the system architecture of the non-booted resource is identified, the information is then passed to the netboot kernel provider 430. The netboot kernel provider 430 then provides the netboot kernel for the non-booted resource 321 architecture to the configuration script provider 440. The configuration script provider 440 will then provide the netboot kernel and the configuration script to the non-booted resource 321. For example, if the resource identified during the MAC address look-up has only one netboot kernel and associated configuration script, the one netboot kernel and configuration script is provided to the non-booted resource 321.

However, if the non-booted resource MAC address look-up results in a plurality of associated netboot kernels and configuration scripts, each applicable netboot kernel will be provided to the configuration script provider 440. The configuration script provider 440 will then provide each netboot kernel and associated configuration script to the non-boot resource 321 until the resource 321 boots or the supply of netboot kernels and associated scripts are exhausted.

For example, a network card may have a MAC address range known to support multiple servers and thereby having a plurality of possible netboot kernel and configuration script associations. In this case, the MAC comparator 420 identifies the servers that are associated with the MAC address. The MAC comparator 420 will provide this information to the netboot kernel provider 430 and configuration script provider 440. Then, as stated herein, the netboot kernel provider 430 and configuration script provider 440 will provide the netboot kernels and configurations (for the listed servers with MAC addresses in this range) to the non-booted resource 321 until it boots or the supply of netboot kernels and associated scripts are exhausted.

In general, the netboot kernel is the first piece of software that is provided via the LAN fabric to start a compute resource. This software is loaded into the systems main memory and remains in place during system operations. As such, this netboot kernel must be made as small as possible while still being able to initiate the device and provide the necessary system services in managing memory, disks, processes, or the like. In general, configuration scripts are programming instructions or commands that are executed automatically. For example, a script provided by Configuration Script Provider 440 will direct non-booted resource 321 to accomplish any number of tasks as determined by an administrator within the NOC.

Referring now to FIG. 5, a table of an exemplary database containing data fields is shown in accordance with one embodiment of the present invention. In general, database 500 contains data fields utilized by the MAC comparator 420 to identify the system architecture of the non-booted resource 321 based on the MAC address or the non-booted server (as shown in rows 510, 520 and 530). In general, the database will includes data fields such as MAC address range (502 and 504) and manufacturer 506. In another embodiment, the database 500 also includes the name of the netboot kernel file, the name of configuration script file and the like.

In one embodiment, the MAC address ranges of the database 500 are automatically updated based on the listing regulated and published by the Institute of Electrical and Electronics Engineers (IEEE) for MAC assignment ranges. For example, when a manufacturer produces a new network device, that manufacturer applies for and receives a MAC address range. Therefore, each manufactures device will have a MAC address from this range permanently programmed therein. The IEEE listing is also updated to reflect the new manufacturer MAC range. In one embodiment, the list is uploaded into the database 500 of the present invention, thereby making this information available to the MAC comparator 420. In another embodiment, the database 500 will only contain portions of the entire IEEE listing, e.g., only contain the portion of the list that reference architecture types utilized in the present network. In another embodiment, the database 500 will utilize a search algorithm for searching an outside IEEE MAC address assignment database.

Furthermore, in another embodiment, the association of the non-booted resource with the netboot kernel that was provided to successfully boot the device will also be recorded in the database 500 or a similar database. For example, after the MAC address is received from non-booted resource 321, and the system architecture is identified in the database 500, each netboot kernel that the manufacturer provides for that particular system architecture is provided to the netboot kernel provider 430. Once a boot is achieved for resource 321 a description of the correct netboot kernel and configuration script will be stored in the database for future reference when booting the same device or a similar device. This will facilitate a quicker boot cycle as the database will provide information on the netboot kernel and configuration that last successfully booted the requesting non-booted resource 321. In another embodiment, no information regarding the correct netboot kernel or configuration script is stored in the database 500 and each time the same, or a similar, resource is booted each netboot kernel and configuration script will be provided to the resource 321 in the manner described herein.

Figure 6:
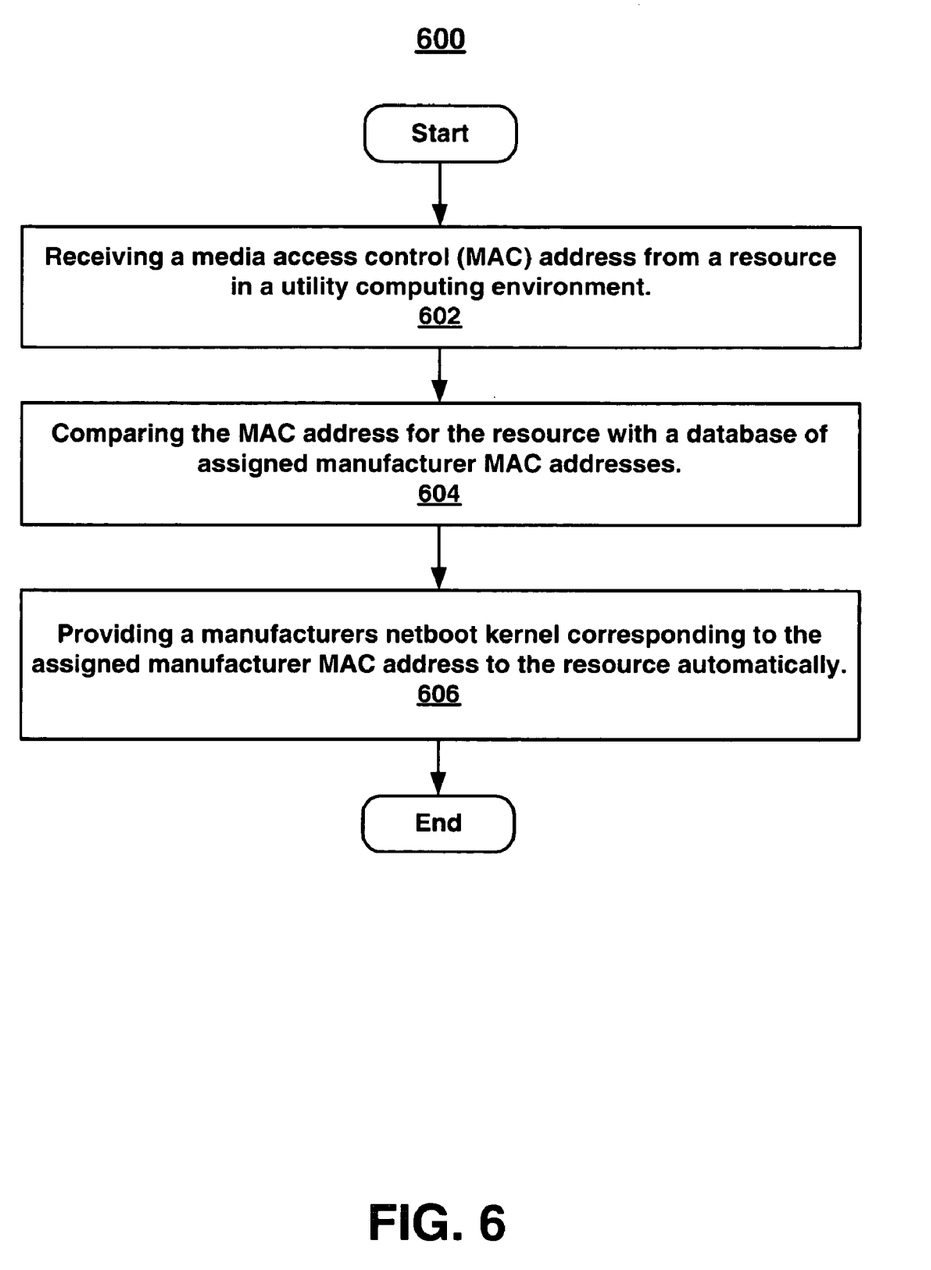
FIG. 6 is a flowchart for a method for an automatic network boot procedure for a resource in a utility computing environment in accordance with one embodiment of the present invention.

Referring now to FIG. 6, a flowchart of one method for using an automatic boot procedure provider in a utility computing environment is shown in accordance with one embodiment of the present invention. By utilizing the automatic boot procedure provider in the utility environment, the process of booting servers in a pre-boot environment can be performed automatically. For example, by utilizing the automatic boot procedure provider, there is no longer a requirement for manual intervention to activate non-booted servers regardless of vendor type, model, different configurations or the like.

With reference now to step 602 of FIG. 6, and to FIG. 3, one embodiment receives a media access control (MAC) address from a resource in a utility computing environment. For example a request is transmitted over the LAN fabric from non-booted resource 321 within the resource pool 320 via the LAN 310 to the automatic boot procedure provider 360. Included in this request is the MAC address of non-booted resource 321.

In general, the MAC address is a unique serial number that is burned into network adapters that identifies that network adapter from all others. For example, one set of network adapters has a MAC address range from 08:00:09:00:00:00 to 08:00:09:FF:FF:FF. An adapter with a MAC address in this range would not only identify the manufacturer, but also the system architecture in which the adapter was deployed.

In another embodiment, the invention receives a boot request from a non-boot resource having an unknown architecture type. For example, non-boot resource 321 within the resource pool 320 may be a new or added resource whose configuration parameters have not been recorded by system administrators within the NOC 355. As part of a boot request, non-booted resource 321 MAC address will be made available to the automatic boot procedure provider 360. For example, in one embodiment, the MAC address is transmitted by a network card as part of the standard pre-boot process for requesting an IP address for the server (e.g., resource 321) from a dynamic host configuration protocol (DHCP) server.

In one embodiment, the dynamic host configuration protocol (DHCP)/bootstrap protocol (bootp) device is utilized to relay a non-booted resource request to the automatic boot procedure provider 360. For example, a DHCP/bootp server sees the network adapter's request from non-booted resource 321 within the resource pool 320 and transmits non-booted resource 321 MAC address to the automatic boot procedure provider 360.

For example, the DHCP/bootp server is a server in an exemplary LAN, and is shown in accordance with embodiments of the present invention, such as computer 136 of LAN 100 in FIG. 1. This DHCP/bootp server receives information from the automatic boot procedure provider 360 and automatically serves the netboot kernel and configuration scripts to boot non-booted resource 321 and place it in the desired state for use. Although the DHCP/bootp server is stated herein, it is understood that embodiments of the present invention are capable of performing the automatic boot procedure without utilizing the DHCP/bootp server.

With reference now to step 604 of FIG. 6, and to FIG. 3, one embodiment compares the MAC address for the resource 321 with a database 500 (of FIG. 3) of assigned manufacturer MAC addresses. For example, the MAC address of the resource 321 will be compared to a database of assigned MAC addresses 500 in order to determine the system architecture of the resource 321.

For example, as stated herein, the Institute of Electrical and Electronics Engineers (IEEE) standards body regulates MAC address assignments and maintains a listing of MAC address ranges assigned to vendors of network adapters. Management of MAC address ranges ensures that each network adapter will have a unique address permanently coded into the adapter. This unique address is referred to as an Organizationally Unique Identifier (OUI). This coupling of MAC addresses with the adapter and manufacturer further allows for identification of the system architecture.

In one embodiment, the database 500 of assigned manufacturer MAC addresses comprises an OUI for each MAC range assignment. For example, after receiving a MAC address from non-booted resource 321 to the automatic boot procedure provider 360, a query of the database 500 reveals the system architecture of non-booted resource 321. In other words, database 500 contains data fields to facilitate the association of a MAC address to system architecture. FIG. 5 provides an example of a database that could contain data fields such as: OUI MAC address, manufacturer, system architecture, boot kernel, configuration scripts, or the like.

With reference now to step 606 of FIG. 6, and to FIG. 3, one embodiment provides a manufacturer's netboot kernel corresponding to the assigned manufacturer MAC address to the resource automatically. For example, upon receiving a MAC address as part of a boot request from non-booted resource 321 within the resource pool 320, the automatic boot procedure provider 360 will provide the netboot kernel to the non-booted resource 321. In one embodiment, the automatic boot procedure provider 360 will utilize a DHCP/bootp server to route the netboot kernel. In another embodiment, the automatic boot procedure provider 360 will utilize a non-DHCP/bootp server to route the netboot kernel.

In another embodiment, the DHCP/bootp server is utilized to issue the corresponding configuration script, which provides unique programming instructions for the non-booted resource. For example, after the automatic boot procedure provider 360 has identified the OUI MAC address of non-booted resource 321 and associates it to a system architecture, the automatic boot procedure provider 360 then provides instruction to have the DCHP/bootp device provide the corresponding configuration script to the non-booted resource in conjunction with the netboot kernel.

As described herein, the MAC address range may include multiple system architectures and require the automatic boot procedure provider 360 to identify multiple netboot kernels and configuration scripts. For example, as described herein, after the automatic boot procedure provider 360 has identified the OUI MAC address of non-booted resource 321, the results of the database query identify that the MAC address in question supports a plurality of system architectures. The automatic boot procedure provider 360 would then provide instruction to have the DHCP/bootp server provide the corresponding netboot kernel for each of the identified system architectures to the resource 321, until a successful boot is achieved or the supply of netboot kernels and configuration scripts is exhausted. In other words, the process of serving a corresponding netboot kernel and configuration script for each identified architecture type continues until a successful boot of resource 321 is achieved.

Therefore, embodiments of the present invention provide methods and systems for an automatic network boot procedure for a resource in a utility computing environment. By using an automated process to identify a non-booted resource in a utility data center (UDC), that non-booted resource can now be introduced into a utility computing environment without requiring a technician to manually enter and configure options on the non-booted resource. In addition, this process can be easily deployed on an already active system, and can also be integrated into previously designed utility computing environments.

Embodiments of the present invention are thus described. While the present invention has been described in particular embodiments, it should be appreciated that the present invention should not be construed as limited by such embodiments, but rather construed according to the following claims.

I claim:

1. A method for an automatic network boot procedure for a resource in a utility computing environment comprising:
   receiving a media access control (MAC) address from a resource in a utility computing environment;
   comparing said MAC address for said resource with a database of assigned manufacturer MAC addresses to determine a manufacturers netboot kernel that corresponds to a manufacturer's system architecture of the resource; and
   providing said manufacturers netboot kernel corresponding to said assigned manufacturer MAC address to said resource automatically.

2. The method of claim 1 further comprising:
   receiving a boot request from said resource having an unknown architecture type.

3. The method of claim 1 further comprising:
   receiving said MAC address from a dynamic host configuration protocol (DHCP) server.

4. The method of claim 1 wherein said database of assigned manufacturer MAC addresses comprises:
   an organizationally unique identifier (OUI) for each MAC range assignment.

5. The method of claim 1 further comprising:
   automatically providing said manufacturers netboot kernel to said resource via a dynamic host configuration protocol (DHCP) server.

6. The method of claim 1 further comprising:
   automatically providing a resource configuration script to said resource via a dynamic host configuration protocol (DHCP) server.

7. The method of claim 1 wherein when a plurality of said manufacturers netboot kernels correspond to said assigned manufacturer MAC address, said method further comprises:
   providing each of said manufacturers netboot kernels automatically to said resource until said resource begins a boot process.

8. An automatic boot procedure provider comprising:
   a processor for executing instructions; and
   a computer-readable medium with the instructions that the processor executes stored on the computer-readable medium, wherein the processor executes the instructions that implement:
      a media access control (MAC) address receiver for receiving a MAC address from a resource in a utility computing environment;
      a comparator for comparing said MAC address from said resource with a database of assigned manufacturer MAC addresses to determine results that include a netboot kernel that corresponds to a manufacturer's system architecture for the resource;
      a netboot kernel provider for providing said netboot kernel to said resource based on said results from said comparator; and
      a configuration script provider for providing a configuration script to said resource based on the results from said comparator.

9. The automatic boot procedure provider of claim 8 wherein said MAC address receiver comprises:

at least one computing device capable of issuing an Internet Protocol (IP) address to said resource.

10. The automatic boot procedure provider of claim 8 wherein said comparator validates said resource MAC address range with said manufacturer's system architecture.

11. The automatic boot procedure provider of claim 8 wherein said netboot kernel provider provides a plurality of netboot kernels associated with said resource MAC address to said resource based on the results from said comparator.

12. The automatic boot procedure provider of claim 8 wherein said configuration script provider provides a plurality of configuration scripts associated with said resource MAC address to said resource based on the results from said comparator.

13. The automatic boot procedure provider of claim 8 further comprising:
a lookup table containing an Organizationally Unique Identifiers (OUI) MAC address range assignments for a resource network interface card (NIC) mapped to a netboot kernel.

14. The automatic boot procedure provider of claim 8 further comprising:
a lookup table containing an Organizationally Unique Identifiers (OUI) MAC address range assignments for a resource network interface card (NIC) mapped to a configuration script.

15. The automatic boot procedure provider of claim 8 further comprising: when a plurality of manufacturers netboot kernels correspond to said assigned manufacturer MAC address, each of said manufacturers netboot kernels is automatically provided to said resource until said resource begins a boot process.

16. A computer-usable medium having computer-readable program code embodied therein for causing a method for an automatic network boot procedure for a plurality of architecture types in utility computing environment comprising:
receiving a media access control (MAC) address from a resource in a utility computing environment;
comparing said MAC address for said resource with a database of assigned manufacturer MAC addresses to determine a manufacturers netboot kernel that corresponds to a manufacturers system architecture of the resource; and
providing said manufacturers netboot kernel corresponding to said assigned manufacturer MAC address to said resource automatically.

17. The computer-usable medium of claim 16 further comprising:
receiving a boot request from said resource having an unknown architecture type.

18. The computer-usable medium of claim 16 further comprising:
receiving said MAC address from a dynamic host configuration protocol (DHCP) server.

19. The computer-usable medium of claim 16 wherein database of assigned manufacturer MAC addresses comprises:
an organizationally unique identifier (OUI) for each MAC range assignment.

20. The computer-usable medium of claim 16 further comprising:
automatically providing said manufacturers netboot kernel to said resource via a dynamic host configuration protocol (DHCP) server.

21. The computer-usable medium of claim 16 further comprising:
automatically providing a resource configuration script to said resource via a dynamic host configuration protocol (DHCP) server.

22. The computer-usable medium of claim 16 wherein when a plurality of said manufacturers netboot kernels correspond to said assigned manufacturer MAC address, said method further comprises:
providing each of said manufacturers netboot kernels automatically to said resource until said resource begins a boot process.

23. A data center comprising:
a plurality of devices, with each device represented in a machine-readable map; and
a plurality of connections coupling the plurality of devices, wherein an automatic network boot procedure receives a boot request from said plurality of devices and said plurality of connections of said machine-readable map and serves netboot kernels associated with said plurality of devices; and
a comparator for automatically mapping a media access control (MAC) address of a particular device to an architecture type to select which netboot kernel, of the netboot kernels, to use for the particular device.

24. The data center of claim 23 further comprising:
a dynamic host configuration protocol (DHCP) for automatically configuring and deploying said plurality of devices.

25. The data center of claim 23 further comprising:
a comparator for automatically mapping the media access control (MAC) address range of said plurality of devices with a plurality of architecture types.

* * * * *